Jan. 2, 1962     L. E. AUSTIN     3,015,309
STAGE MOTOR
Filed Nov. 1, 1955
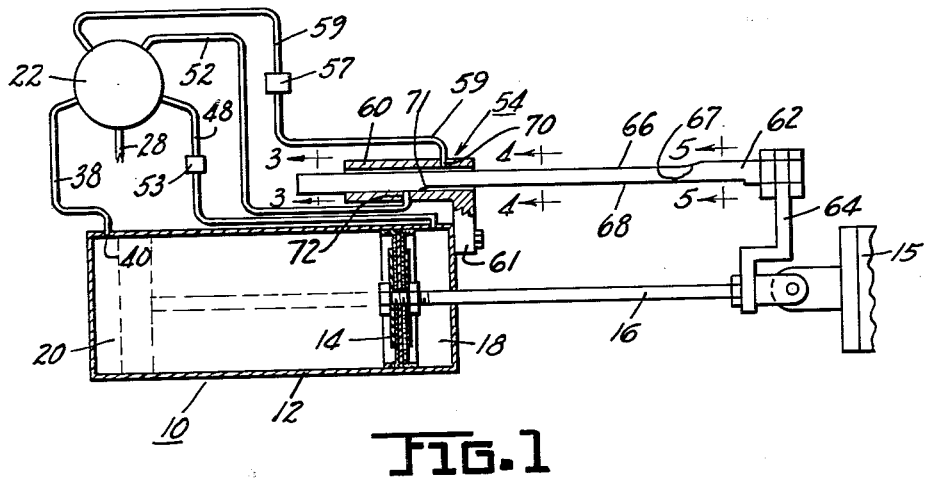
FIG.1
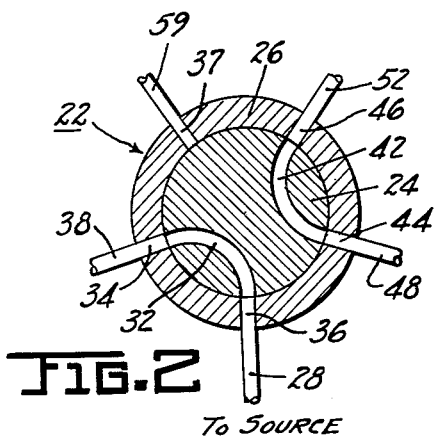
FIG.2    To Source
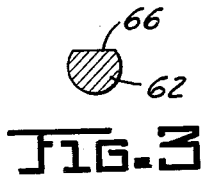
FIG.3
FIG.4
FIG.5
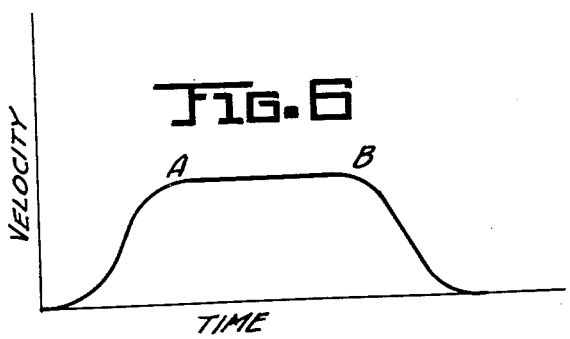
FIG.6
INVENTOR.
LEONARD E. AUSTIN
BY
H. O. Clayton
ATTORNEY

United States Patent Office 3,015,309
Patented Jan. 2, 1962

3,015,309
STAGE MOTOR
Leonard Edmond Austin, South Bend, Ind., assignor to
The Bendix Corporation, a corporation of Delaware
Filed Nov. 1, 1955, Ser. No. 544,132
4 Claims. (Cl. 121—38)

This invention relates in general to a device for controlling the movement of a work piece, such as a part of an automotive brake being combined, by an assembly mechanism, with other brake parts to complete the brake unit; and in particular this invention relates to a device for controlling the deceleration of said work piece as it is being worked upon. The so-called work piece being moved is, of course, mounted in a clamp or other housing and the device constituting my invention serves to control the movement of the two as a unit.

In a brake assembly machine it is desirable at times to move a brake part or other load from one position to another in a plurality of stages, and it is an object of my invention to provide a device for moving a load a certain distance in a relatively short period of time, all but the last stage of said movement being relatively quickly effected and the last or decelerating stage of said movement also being relatively quickly and smoothly effected to avoid subjecting the brake part to an undesirable shock.

It is a further object of my invention to provide means for controlling the movement of a mass, said means including a double acting double ended pressure differential operated motor, the pressure exerted by the power fluid within said motor being controlled in large measure by a flow control valve actuated by the power element of the motor.

Yet another object of my invention is to provide a double acting fluid pressure motor controlled by a plurality of valves, one of the same being controlled by means actuated by the power element of the motor and operative as a function of its position, and another of said valves being controlled by a manually adjustable means.

A further object of my invention is to provide a compact and effective load controlling pressure differential operated motor well suited for installation in mechanisms such as a brake assembly machine.

A further object of my invention is to provide a fluid pressure motor operable to move a load a relatively short distance in a relatively short period of time without subjecting the load to a severe and damaging shock; that is a shock which would result from subjecting the load to a relatively high deceleration.

Other objects of the invention and desirable details of construction of parts will become apparent from the following detailed description of an illustrative embodiment of the invention, taken in conjunction with the accompanying drawings illustrating said embodiment, in which:

FIGURE 1 is a diagrammatic view, showing certain parts in section, disclosing the details of the load controlling fluid pressure operated motor and control means constituting my invention;

FIGURE 2 is a sectional view disclosing details of one of the control valves of the mechanism of FIGURE 1;

FIGURES 3, 4, and 5 are sectional views taken, respectively, on the lines 3—3, 4—4, and 5—5 of FIGURE 1, disclosing details of one of the control valve mechanisms of my invention; and FIGURE 6 is a velocity time graph, indicating the movement of the load controlled by the device of FIGURE 1.

Referring now to FIGURE 1, disclosing a preferred embodiment of my invention, a fluid pressure operated motor, indicated by the reference numeral 10, includes a double ended tubular casing 12 housing a piston 14 reciprocable therein. This piston, that is power element of the motor, is connected to a load 15 by a rod 16. The load may, for example, be a part of a brake secured to a clamp, said part to be combined with other brake parts to make up an automotive brake unit. In a mechanism for assembling the parts of such a unit it is often desirable, in the interests of minimizing the time required to assemble the unit, to move a load a relatively short distance in a relatively short period of time without, however, subjecting the load to damaging shocks; and my invention is designed to effect this end.

The mode of movement of the piston 14, and therefore the mode of movement of the load, is controlled by controlling the forces acting upon said piston during its power stroke to the right and its power stroke to the left, FIGURE 1. The force acting upon the piston tending to move it to the left, FIGURE 1, is the force exerted by the power fluid in a chamber 18 of the motor; and the forces opposing this force, and effective to maintain for a certain time a constant or substantially constant velocity of the piston once it has reached the desired velocity and to then decelerate the piston are, in a large measure, the forces exerted by the power fluid in a chamber 20 of the motor. When the piston and its connected load is moved to the right to the position disclosed in FIGURE 1, the controlling effect of the fluid pressures in the chambers 18 and 20 is the reversal of the aforementioned control; for then the fluid pressure in the chamber 20 determines the force to effect a movement of the piston and its connected load to the right; and the fluid pressure in the chamber 18 in large measure determines the force controlling the mode of movement of the piston in this direction once its movement has been initiated by the force exerted by the fluid within the chamber 20.

Describing now the means for controlling the fluid pressures within the chambers 18 and 20, a 4-way valve 22, preferably power actuated, admits fluid, preferably air, into one or the other of said chambers. To effect this end a rotatable cylindrically shaped valve member 24, housed within a casing 26, is rotated counterclockwise to the position disclosed in FIGURE 1 to connect the compartment 20 with a conduit 28 leading to a source of air under pressure, not shown; and when the member 24 is rotated clockwise from the position disclosed in FIGURE 1, the conduit 28 is connected to the compartment 18 of the motor. Describing in greater detail the operation and structure of the valve 22, when the member 24 is in the position disclosed in FIGURE 2, U-shaped duct 32 in the member 24 registers with ports 34 and 36 in the valve casing. The conduit 28 is then connected to the port 36 and a conduit 38 is connected at one of its ends to the port 34 and at its other end with a port 40 in the motor casing, the latter port registering with the motor chamber 20; and when the valve member 24 is in the position disclosed in FIGURE 2, a U-shaped duct 42 in said member serves, via a conduit 48 and a conduit 52, to interconnect the compartment 18 with a manually controlled bleed valve 53 and a flow control valve 54. In this operation of venting the air in the chamber 18 with the atmosphere, ports 44 and 46 in the valve casing serve, respectively, to interconnect the conduit 48 with the duct 42 and the conduit 52 with said duct.

As to the operation of the valve 22 to place the chamber 18 in communication with the source of air pressure and at the same time to vent the chamber 20 to the atmosphere, when the valve member 24 is rotated clockwise from the position disclosed in FIGURE 2, the duct 42 in the valve member 24 registers with the ports 36 and 44 in the valve casing to connect the chamber 18 to the source of pressure; and this operation of the valve results, by the registering of the duct 32 with the port 34 and a port 37, in the venting of the chamber 20 to the atmosphere via the valve 54 and a manually adjustable bleed valve 57. The valve 57 is incorporated in a conduit 59 which interconnects the valve 54 and valve 22.

Describing now the flow control valve which constitutes an important feature of my invention, this valve includes a casing 60 preferably adjustably secured to the motor casing 12 by a bracket 61 and bored to receive a generally cylindrically shaped valve member 62. The member 62 is relatively tightly fitted within the casing 60 to obviate leakage of air from the conduits 52 and 59 when the full bodied portion of said member covers the ports 70 and 72. The valve member 62 is moved back and forth within the casing by means of a cross piece 64 secured at its ends to the member 62 and the piston rod 16; and the member 62 is provided with lands 66 and 68 which, as will be described below, register, respectively, with ports 70 and 72 in the valve casing. The land portion 66 of the valve member 62 inclines, that is tapers, at 67 into the full bodied portion of the valve; and the land portion 68 of said valve members inclines, that is tapers, at 71 into the full bodied portion of the valve. The conduit 59 is connected to the port 70 and the conduit 52 is connected to the port 72.

Describing now the complete operation of the mechanism constituting my invention, to effect a relatively rapid leftward movement of the piston 14 and the work piece 15 connected thereto, the valve 22 is actuated to connect the motor compartment 18 with the source of air pressure; and connect the motor compartment 20 with the atmosphere via the valves 57 and 54. The air in the vented compartment 20 will then quickly approach atmospheric pressure and the pressure in the compartment 18 will be quickly brought up to the pressure of the source of air pressure to which the conduit 28 is connected. Then the piston and its connected load will, as soon as the differential of pressures acting on the piston is great enough, be accelerated to the left as indicated by the time velocity graph disclosed in FIGURE 6 of the drawings. At some time thereafter the forces acting on the piston will be balanced whereupon, as indicated by the section between A and B of the graph of FIGURE 6, the velocity of movement of the load will be held constant or substantially constant during another stage of travel of said load; for during the latter stage of operation of the mechanism the air leaving the port 70 in the valve casing 60 is, by virtue of the land 66, unobstructed; however, when the tapered portion 67 of the valve member passed underneath the port 70, then the rate of flow of air from said port is controlled by the shape of said portion. The shape of the portion 67 determines, in a large measure, the deceleration of the work.

As to this last stage of operation of the mechanism the load is, at point B on the graph, traveling at a relatively high velocity and at this point said load is nearing the end of its stroke. It is accordingly necessary, to avoid undue shock to the load, to control its deceleration as it approaches the end of its stroke. This is effected by the operation of the valve 54 as just described; that is the operation resulting from the shape of the tapered portion 67. When the member 62 has moved sufficiently to close the port 70, the air in the compartment 20 is brought down to atmospheric pressure by the fixed leak of air from the adjustable bleed valve 57; however, the piston 14 has completed, or substantially completed, its stroke before the latter operation is completed.

The rightward movement of the load is, in large measure, also controlled by the flow control valve 54, said movement being initiated by the operation of the 4-way valve 22. As with the above described leftward movement of the load, the rightward movement is determined by controlling the differential of pressure acting on the piston 14; and this differential is, in large measure, controlled by the rate of efflux of air from the valve 54. Briefly describing this operation, the piston 14 is then at its rest position preparatory to moving to the right, that is the leftward dotted line position of FIGURE 1. The valve 22 is then operated to place the compartment 20 in communication with the source of air pressure and vent the compartment 18 to the atmosphere. The piston 14 is then moved to the right, the mode of its movement being indicated by the graph of FIGURE 6. In this operation, as with the previously described leftward movement operation of the piston, the velocity of the piston and its connected load is, after the initial varied acceleration of the load, constant or substantially constant whereupon the load is decelerated depending upon the rate of flow of air from the port 72 in the valve 54. The valve member 62 in this operation is moved to bring the tapered portion 71 into registry with the port 72 to control the deceleration of the work. As with the previously described operation, the bleed valve, that is the valve 53, operates to bleed the air from the compartment 18 to the atmosphere after the piston has completed its stroke; in other words, the pressure in the compartment 18 is brought down to atmospheric after the piston has completed its stroke.

There is thus provided, by the double acting pressure differential operated motor mechanism of my invention, a relatively simple and effective mechanism for controlling the mode of movement of a load in the desired direction as above described, said movement being effected in a plurality of stages in a relatively short period of time, there being in the stroke of movement of the load, no deceleration factor amounting to a shock which would damage said load.

While the preferred embodiment of the invention has been described in considerable detail, I do not wish to be limited to the particular construction shown which may be varied within the scope of the invention, and it is the intention to cover hereby all adaptations, modifications and arrangements thereof which come within the practice of those skilled in the art to which the invention relates.

I claim:

1. A motor mechanism for controlling the movement of a load in a plurality of directions said mechanism including a double acting, double ended pressure differential operated motor comprising a cylinder and a power element therein, means connected with the power element and adapted to be connected to the load the movement of which is to be controlled, and means for controlling the operation of the motor including a 4-way valve for controlling the influx of power fluid into the motor to impose a force upon the power element and to determine the direction of movement of the load to be moved, other valve means, comprising a part, having fluid controlling ports therein, fixed to the cylinder and a part fixedly secured to the power element and reciprocable within the latter part, separate conduits interconnecting said ports with the 4-way valve, and two separate conduits interconnecting the motor with the 4-way valve, said conduits and valve mechanism serving to control the efflux of power fluid from the motor and thereby control the mode of movement of the load as it is moved from one place to another, the part connected to the power element having a plurality of flat faced portions and a plurality of tapered portions thereon both of said portions cooperating with the aforementioned ports to control the efflux of power fluid from the motor.

2. A motor mechanism for controlling the movement of a load in a plurality of directions said mechanism including a double acting pressure differential operated motor comprising a cylinder and a power element therein, means, connected with the power element and adapted to be connected to the load the movement of which is to be controlled, and means for controlling the operation of the motor including a 4-way valve for controlling the influx of power fluid into the motor to impose a force upon the power element to determine the direction of movement of the load, flow control valve means for controlling the efflux of power fluid from the motor and thereby control the mode of movement of the load as it is moved from one place to another, said flow control valve means including a two part valve one of said parts being connected to the cylinder and being bored to provide a plurality of ports and a relatively long tubular shaped opening therein, and the other of said parts being fixedly secured to the power element and being irregularly shaped to cooperate with the opening and ports of the bored part in controlling the flow of power fluid through said ports, said irregular shape providing a flattened top portion extending from one end of the part and merging into an inclined portion of said part and further providing a flattened bottom portion of said part extending from the other end of the part and merging with an inclined portion of the part; and other means for controlling the operation of the motor including two separate conduits interconnecting said ports with the 4-way valve, and two separate conduits interconnecting the motor with the 4-way valve, said conduits and valve mechanism serving to control the influx of power fluid from the motor and thereby control the mode of movement of the load as it is moved from one place to another.

3. A motor mechanism for controlling the movement of a load in a plurality of directions, said mechanism including a double acting, double ended pressure differential operated motor comprising a cylinder and a power element slidably contained therein, means operatively connecting said power element with said load whereby the movement of the load is controlled by said power element, and means for controlling the operation of the motor including a 4-way valve for simultaneously controlling the ingress of power fluid at one end of the motor and the egress of power fluid at the opposite end of the motor to thereby impose a force upon said power element and determine the direction of movement of said power element and thus the load, other valve means comprising a first part having fluid controlling ports therein and a second part reciprocable within said first part for controlling the rate of fluid flow through said fluid ports, said second part being fixedly secured to said power element and movable therewith throughout the range of travel of said power element, two separate conduits interconnecting said ports with the 4-way valve, two separate conduits interconnecting opposite ends of the motor with the 4-way valve, said conduits together with said 4-way valve and said other valve means serving to control the flow of power fluid from the motor and thereby control the mode of movement of the load as it is moved from one place to another, said second part being operative to control the rate of fluid flow from one or the other of said fluid controlling ports depending upon the direction of movement of said power element.

4. A valve adapted to control the rate of flow of power fluid from a fluid pressure motor and thereby control the mode of movement of the power element of said motor, said valve including a fixed member having a valve member receiving opening therein and also having two power fluid controlling ports therein, an elongated valve member mounted for longitudinal movement within said opening and serving, depending upon its position with respect to the fixed valve member, to control the rate of flow of power fluid through one or the other of said ports, means operatively connecting said elongated valve member with said power element, said power element and said elongated valve member being movable as a unit throughout the range of travel of said power element, said elongated valve member being operative to vent one or the other of said two ports depending upon the direction of movement of said power element to a low pressure source over the major portion of travel of said power element and block said port over the remaining portion of travel of said power element, and means operative to vent the fluid upstream from said blocked port to said low pressure source at a relatively slow rate to thereby reduce the velocity of said power element over said remaining portion of the travel of said power element.

References Cited in the file of this patent

UNITED STATES PATENTS

| | | |
|---|---|---|
| 635,848 | Dutton | Oct. 31, 1899 |
| 1,685,750 | Pfau | Sept. 25, 1928 |
| 1,877,102 | Whitesell | Sept. 13, 1932 |
| 1,931,902 | Oyster | Oct. 24, 1933 |
| 2,136,693 | Kniskern | Nov. 15, 1938 |
| 2,204,672 | Folberth | June 18, 1940 |
| 2,484,646 | Renkenberger | Oct. 11, 1949 |
| 2,523,572 | Jansson | Sept. 26, 1950 |
| 2,580,751 | Fletcher | Jan. 1, 1952 |
| 2,670,713 | Jirsa | Mar. 2, 1954 |
| 2,867,192 | Ettinger et al. | Jan. 6, 1959 |

UNITED STATES PATENT OFFICE

CERTIFICATE OF CORRECTION

Patent No. 3,015,309 January 2, 1962

Leonard Edmond Austin

It is hereby certified that error appears in the above numbered patent requiring correction and that the said Letters Patent should read as corrected below.

Column 4, line 52, before "separate" insert -- two --.

Signed and sealed this 12th day of June 1962.

(SEAL)
Attest:

ERNEST W. SWIDER
Attesting Officer

DAVID L. LADD
Commissioner of Patents